(12) United States Patent
Falk et al.

(10) Patent No.: US 7,212,295 B2
(45) Date of Patent: May 1, 2007

(54) KEYBOARD FOR IMAGING DEVICES

(75) Inventors: Kevin Falk, Boise, ID (US); Russell A. Mendenhall, Boise, ID (US); Joseph J. Cooper, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 851 days.

(21) Appl. No.: 10/288,355

(22) Filed: Nov. 4, 2002

(65) Prior Publication Data

US 2004/0085574 A1 May 6, 2004

(51) Int. Cl.
*H04N 1/00* (2006.01)
*G09G 5/00* (2006.01)

(52) U.S. Cl. .................... 358/1.1; 345/168; 725/13; 358/400

(58) Field of Classification Search .......... 358/400, 358/401, 468, 527, 442, 1.1; 345/682, 157, 345/160, 161, 168, 169; 725/37, 13
See application file for complete search history.

(56) References Cited

U.S. PATENT DOCUMENTS

| | | | |
|---|---|---|---|
| 4,379,336 A | | 4/1983 | Yamamoto et al. |
| 5,051,009 A | * | 9/1991 | Sugiura et al. ........ 400/120.16 |
| 5,200,859 A | * | 4/1993 | Payner et al. ............... 359/857 |
| 5,214,574 A | | 5/1993 | Chang |
| 5,316,107 A | * | 5/1994 | Wieschemann et al. ...... 186/61 |
| 5,400,246 A | * | 3/1995 | Wilson et al. ................ 700/17 |
| 5,499,108 A | | 3/1996 | Cotte et al. |
| 5,671,463 A | * | 9/1997 | Morikawa et al. ............. 399/86 |
| 5,798,848 A | * | 8/1998 | Ouchi ........................ 358/468 |
| 5,859,762 A | * | 1/1999 | Clark et al. .................. 361/686 |
| 5,877,746 A | * | 3/1999 | Parks et al. .................. 345/156 |
| 5,895,452 A | * | 4/1999 | Lum ............................ 705/16 |
| 6,266,234 B1 | * | 7/2001 | Leman ....................... 361/680 |
| 6,282,082 B1 | * | 8/2001 | Armitage et al. ........... 361/681 |
| 6,504,626 B1 | * | 1/2003 | Shih ........................... 358/442 |
| 6,580,799 B1 | * | 6/2003 | Azima et al. ............... 381/333 |
| 6,587,094 B2 | * | 7/2003 | Anderson ................... 345/168 |
| 6,788,530 B2 | * | 9/2004 | Hill et al. .................... 361/683 |
| 6,960,988 B2 | * | 11/2005 | Blink et al. ............ 340/286.09 |
| 2003/0131358 A1 | * | 7/2003 | Busch et al. ................. 725/105 |
| 2003/0197687 A1 | * | 10/2003 | Shetter ........................ 345/173 |
| 2003/0200566 A1 | * | 10/2003 | Streatfield et al. .......... 800/288 |

FOREIGN PATENT DOCUMENTS

| | | | |
|---|---|---|---|
| JP | 362220056 | * | 9/1987 |
| JP | 363298581 | * | 12/1988 |
| JP | 2000-284713 | * | 10/2000 |
| JP | 2000276137 | * | 10/2000 |

* cited by examiner

*Primary Examiner*—Jerome Grant

(57) ABSTRACT

A removable and re-attachable keyboard device for interfacing with an imaging device in a position adjacent to a display on the imaging device is presented. The keyboard device docks or otherwise couples the imaging device as opposed to residing on the table or base upon which the imaging device resides. The keyboard device includes a keyboard base which is generally planar with one end thereof being a keyboard base interface for facilitating at least mechanical coupling of the keyboard device with the imaging device and a keyboard. The keyboard base supports and maintains the keyboard in an ergonomic and more user-friendly attitude in relationship to a display of the imaging device. Messaging services are also available for dispatching directly from the imaging device as a result of data input to the keyboard device.

21 Claims, 7 Drawing Sheets

KEYBOARD FOR IMAGING DEVICES

BACKGROUND OF THE INVENTION

1. Field of the Invention

The present invention relates generally to the field of imaging devices and, more specifically, to the field of data entry into such imaging devices.

2. State of the Art

Imaging devices, such as printers, copiers, scanners, facsimile machines, and the like, have generally and frequently been thought of as output devices which are typically controlled by an attached computer or other control device. For example, a printer is generally coupled to a computer which serves as the user interface device for the printer system. Likewise, copiers have generally lacked a sophisticated user interface and even more so, a sophisticated data input mechanism. As such, any sophisticated form of interface with these devices was generally retained at a remote location such as at an attached or networked controlling system, such as a computer.

As imaging devices became more complex, imaging devices assimilated simplified user interfaces at the device itself. Such interfaces took the form of displays that issued error codes or status and further included buttons for performing elementary control, such as reset, operations. Additionally, some imaging devices such as copiers and facsimile devices integrated numeric keypads allowing the user to input a print quantity, dialing sequence or other numeric value. As imaging devices have become more sophisticated, there is an increased need to provide a more efficient user-friendly and user-accustomed interface at the device itself.

FIG. 1 illustrates the coupling of an imaging device, such as a printer, copier, facsimile machine, scanner device, and the like, which is used for the processing, namely, printing, copying, scanning, or other print application or printed material analysis, of a target media to a keyboard. Those familiar with imaging devices 10 appreciate that such devices have become increasingly complex and sophisticated and therefore require not only extensive configuration, but may also require some forms of data input. For limited amounts of data entry, a control panel such as a keypad 12 may be sufficient. However, for any significant amount of user input data, a more ergonomic or user-friendly interface and entry mechanism is desirable. FIG. 1 illustrates a prior art configuration coupling a keyboard 14 to an imaging device 10 by utilizing the freestanding capabilities of keyboard 14. Because of the lack of spatial relationship between keyboard 14 and any display mechanism associated with imaging device 10, such data entry technique is limited in both efficient data input as well as ergonomic desirability. Therefore, there exists a need to provide a more usable data-entry configuration for use directly at an imaging device that facilitates both an efficient and user-accustomed input device as well as an ergonomic and usably efficient association with an imaging device display.

BRIEF SUMMARY OF THE INVENTION

A removable and re-attachable keyboard device for interfacing with an imaging device in a position adjacent to a display on the imaging device is presented. The keyboard device docks or otherwise couples to the imaging device as opposed to residing on the table or base upon which the imaging device resides. The keyboard device includes a keyboard base which is generally planar with one end thereof having a keyboard base interface for facilitating coupling of the keyboard device with the imaging device. In one embodiment, the keyboard base also provides intermediary electronic coupling to the imaging device. The keyboard base when coupled to the imaging device extends therefrom in a generally cantilevered manner to provide an ergonomic a base or platform for a data entry device such as a keyboard.

The keyboard device also includes a keyboard that is substantially supported by the keyboard base. The keyboard, in one embodiment, is placed in adjacent contact with the keyboard base with the cantilevered end extending sufficiently from the imaging device so as to allow an ergonomic utilization of the keyboard by a user without encumbrances from the imaging device. The keyboard provides an extended data entry device for allowing an enhanced and efficient interface with the imaging device because of the collocation of the keyboard and the imaging device as well as the availability of an extended keyboard that more closely parallels the data input devices of other computing environments. In another embodiment, the keyboard is integrated with the keyboard base to form a unitary or integral keyboard device.

The keyboard device may couple to the imaging device through mechanical channels or means in the imaging device that may be utilized for attachment of other accessories. Access to these mechanical channels, in one embodiment, is accomplished through an access panel on a media tray of the imaging device. More specifically, a multipurpose media tray may include an access panel that, when opened, reveals a single sheet media feeder and/or envelope feeder. This region of the imaging device frequently includes mechanical and/or electrical ports or docking arrangements for other accessories. In one embodiment, the mechanical and electrical channeling utilized by an accessory such as a power envelope feeder is utilized as the electromechanical coupling structures for hosting the keyboard device of the present invention.

The keyboard device when coupled to the imaging device may also be further coupled to a network and engage in networking functionality such as digital sending and the like. Digital sending allows emails or other messaging services to be initiated at the imaging device without requiring intervention by another network entity.

DETAILED DESCRIPTION OF THE INVENTION

Figure 1:
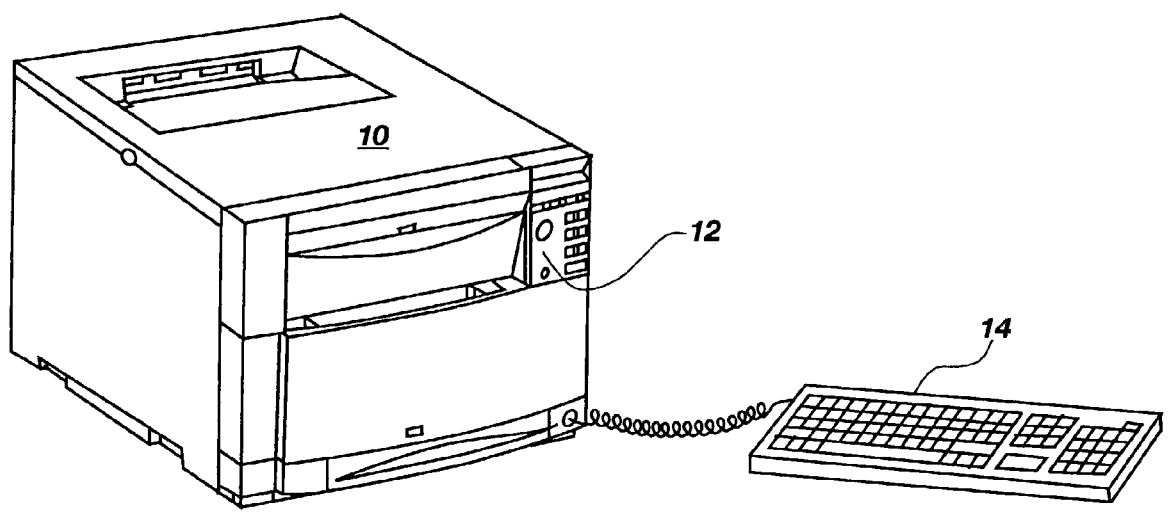
FIG. 1 illustrates the coupling of a keyboard to an imaging device, in accordance with the prior art.
Figure 2:
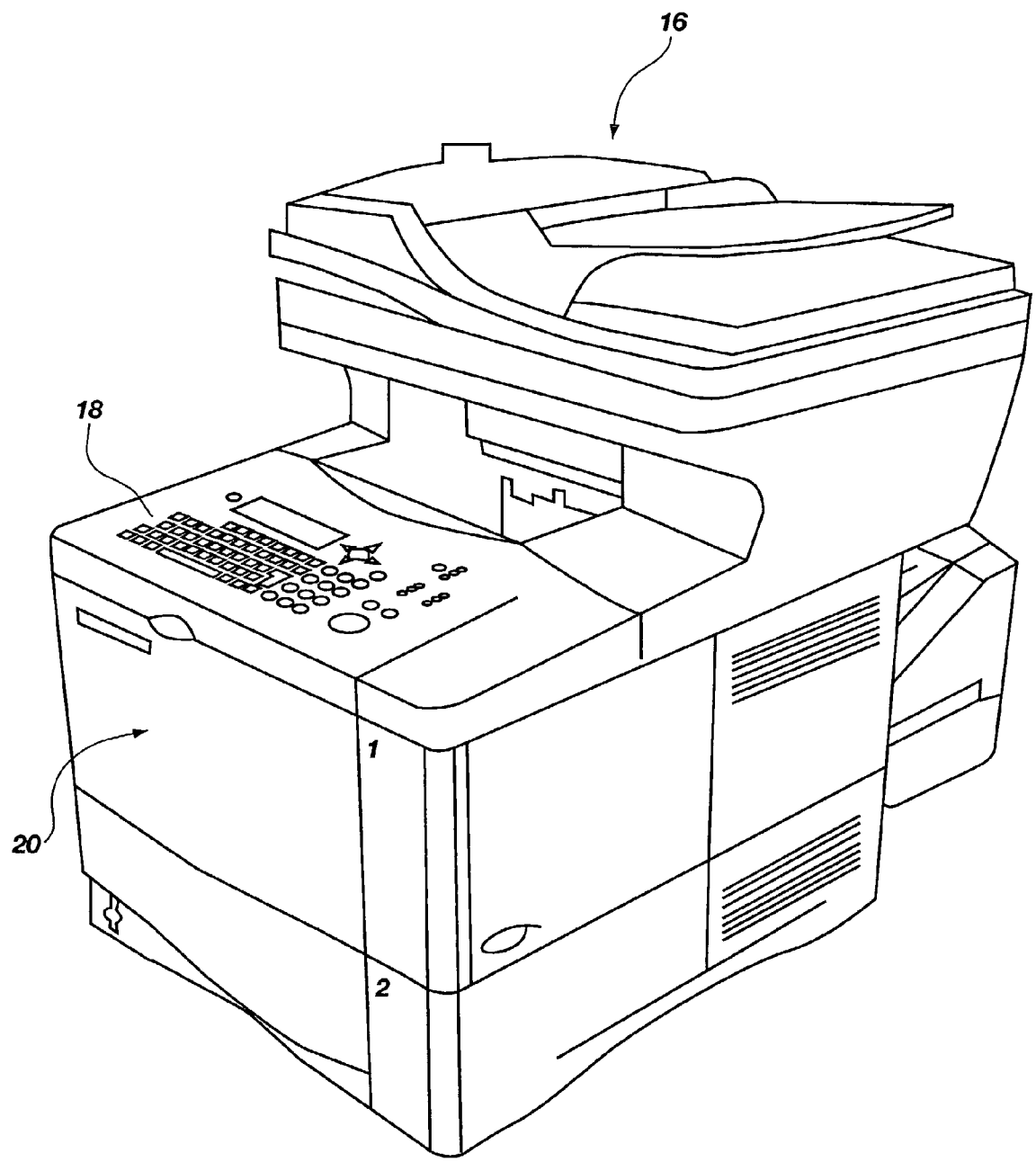
FIG. 2 illustrates an imaging device with an integrated keyboard.

FIG. 2 illustrates an imaging device wherein the keyboard device of the present invention may find application. FIG. 2 illustrates an imaging device 16 which integrates a keyboard-like arrangement of buttons, depicted generally as integrated keypad 18. It should be appreciated that while such an array of input buttons may provide a desirable spectrum of alpha-numeric button choices, the placement, usability, and ergonomics associated with the button functionality as well as the attitude of the keyboard in relationship to the display and to a typical user are both uncomfortable and inefficient for data entry. Moreover, the vast majority of imaging devices provide a very limited data entry capability.

Furthermore, the integration of a data entry mechanism results in design constraints which may require the reservation of certain facets of imaging device 16 for utilization by a data input mechanism. Such design requirements may result in a configuration of an imaging device which may not provide an ergonomic data entry interface. By way of example and not limitation, an exemplary media device with which the present invention may find application may be one having similar features and functionality as a LaserJet® 4100 mfp manufactured by Hewlett Packard of Boise, Id.

While coupling of the present invention to an imaging device may occur at any facet of the imaging device, the present example contemplates interfacing through a media tray interface. Such an exemplary illustration is not to be considered limiting but merely illustrative. As depicted generally in FIG. 2, an imaging device may take the form of a printer, copier, photograph printer, facsimile machine, scanner, or the like wherein an image is either to be impressed upon media or media with an image already pressed thereupon is to be processed, such as scanned or otherwise imaged.

An imaging device provides a mechanical means for accessories or external devices to couple or otherwise dock to the imaging device. An exemplary coupling or docking port is provided for through a media tray. An imaging device may include at least one media tray for the storage of media to be processed. One such tray is illustrated in FIG. 2 as tray 20, depicted in a closed position. Those of skill in the art appreciate that such trays may assume various configurations including a configuration wherein one facet of the media tray may include an access panel, illustrated in FIG. 3 as access panel 22.

Figure 3:
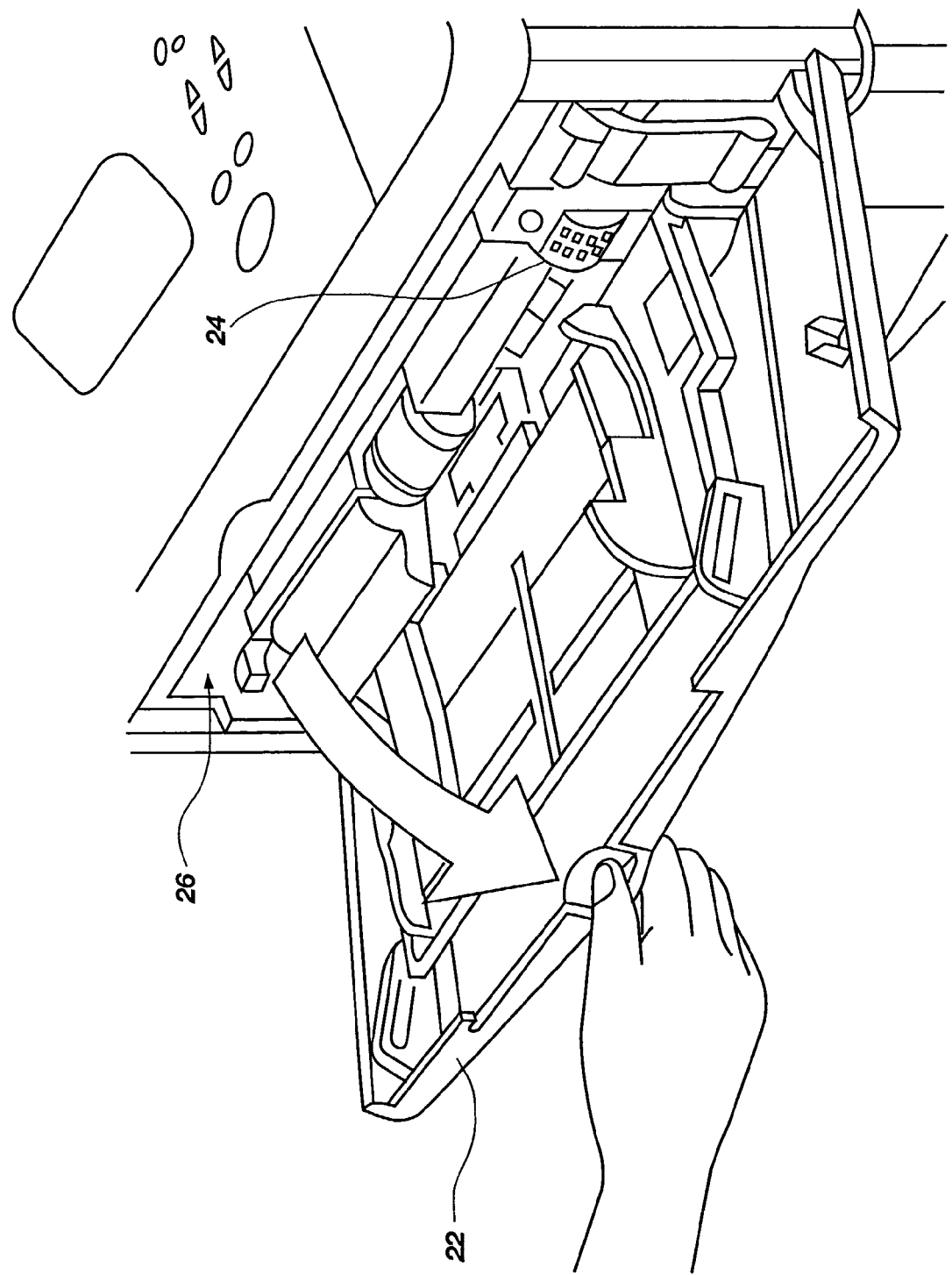
FIG. 3 illustrates an access panel associated with a multipurpose media tray of an imaging device for use in an embodiment of the present invention.

It should be appreciated that upon the opening of access panel 22, as illustrated in FIG. 3, other media feeding options are presented to a user, including single-sheet feeding, envelope feeding, and the coupling or insertion of dedicated media feeding devices or accessories such as an externally coupleable envelope feeder. In one embodiment of the present invention, the keyboard device of the present invention is coupled through an accessory interface made available for the coupling of an accessory when access panel 22 is in an open position. The opening of access panel 22 further makes available multipurpose electrical interface coupler 24 as well as mechanical coupling structures 26 illustrated in FIG. 3.

Figure 4:
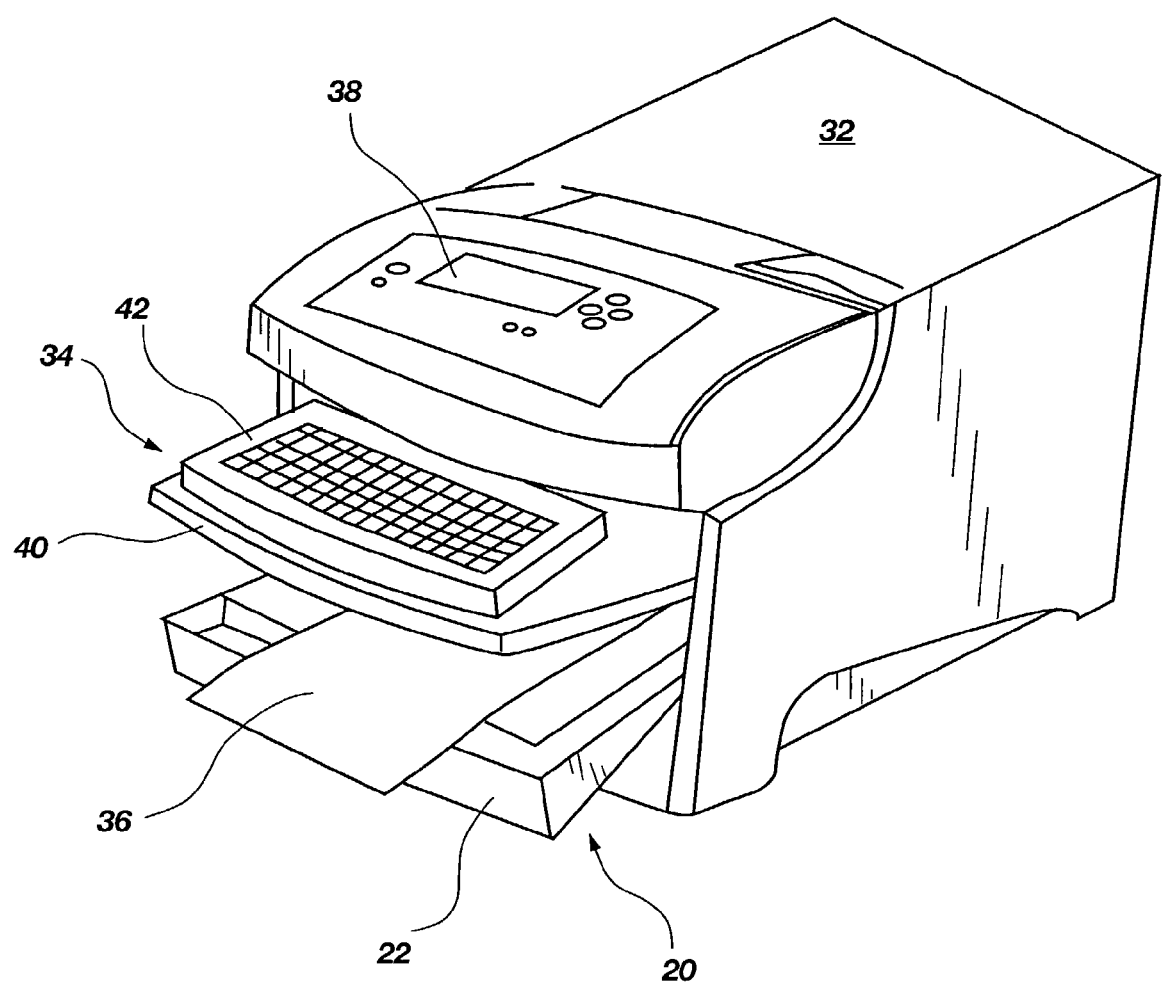
FIG. 4 is a perspective view of an imaging-device with an embodiment of the present invention interfaced thereto.

FIG. 4 is a perspective view of an imaging device incorporating a keyboard device, in accordance with an embodiment of the present invention. In FIG. 4, an imaging system 30 is comprised of an imaging device 32 and a keyboard device 34 coupled thereto. In FIG. 4, a multipurpose media tray 20 is illustrated with access panel 22 being illustrated in an open position with media 36 being fed therethrough into imaging device 32.

In order to enhance the data input capabilities of imaging device 32, a keyboard device 34 is coupled both mechanically and electrically into the available mechanical coupling structures 26 (FIG. 3) as well as to the electrical interface coupler 24 (FIG. 3) of imaging device 32. It should be appreciated that in the present embodiment, keyboard device 34 is located in an ergonomically desirable relationship with the control panel display 38 of imaging device 32. Those of skill in the art appreciate the removable and attachable nature of such a configuration of keyboard device 34.

By way of introduction and as further described in detail below, keyboard device 34 is comprised of a keyboard base 40 for physically attaching, both mechanically and alternatively electrically, to imaging device 32. Keyboard base 40 orients to imaging device 32 in a generally cantilevered orientation, preferably at an ergonomic attitude in relationship to a user orientation, and also at a location in usable proximity to control panel display 38.

Figure 6:
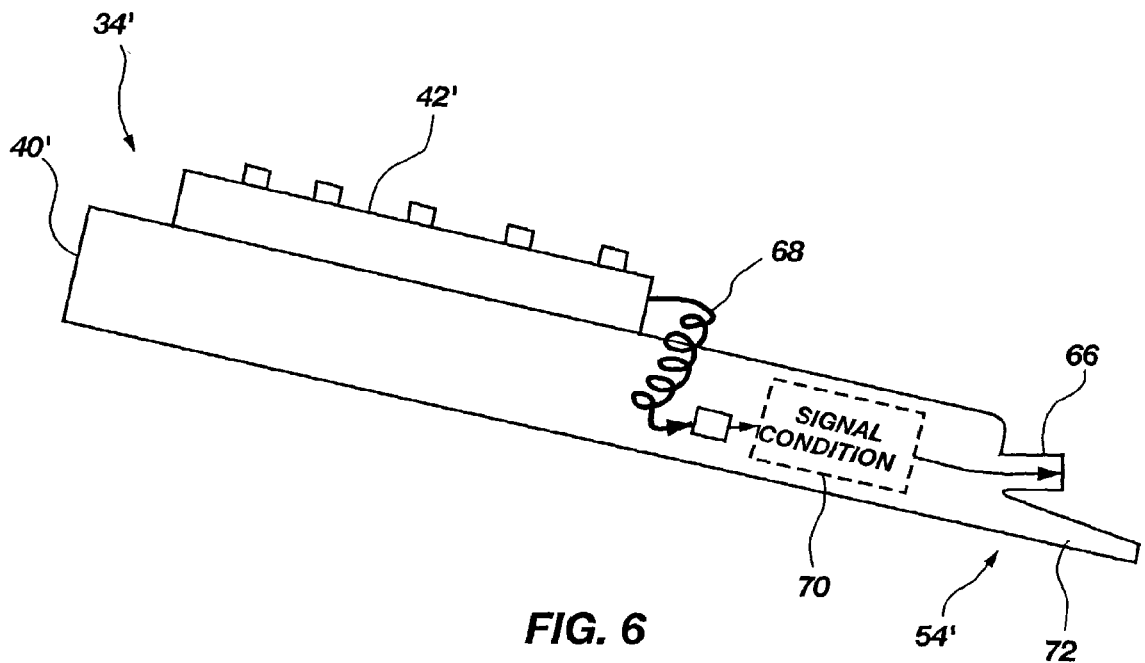
FIG. 6 illustrates a keyboard device, in accordance with one embodiment of the present invention.
Figure 7:
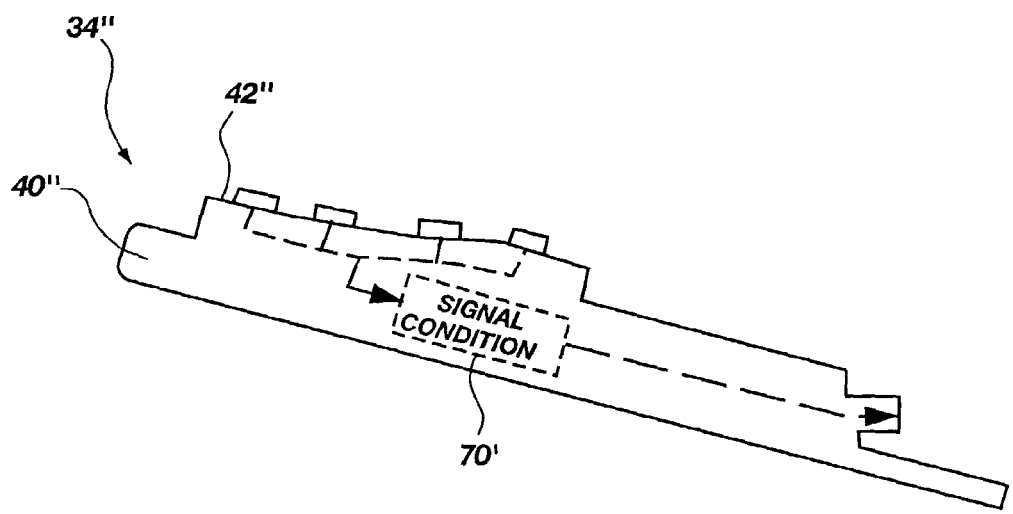
FIG. 7 illustrates a keyboard device, in accordance with another embodiment of the present invention.
Figure 8:
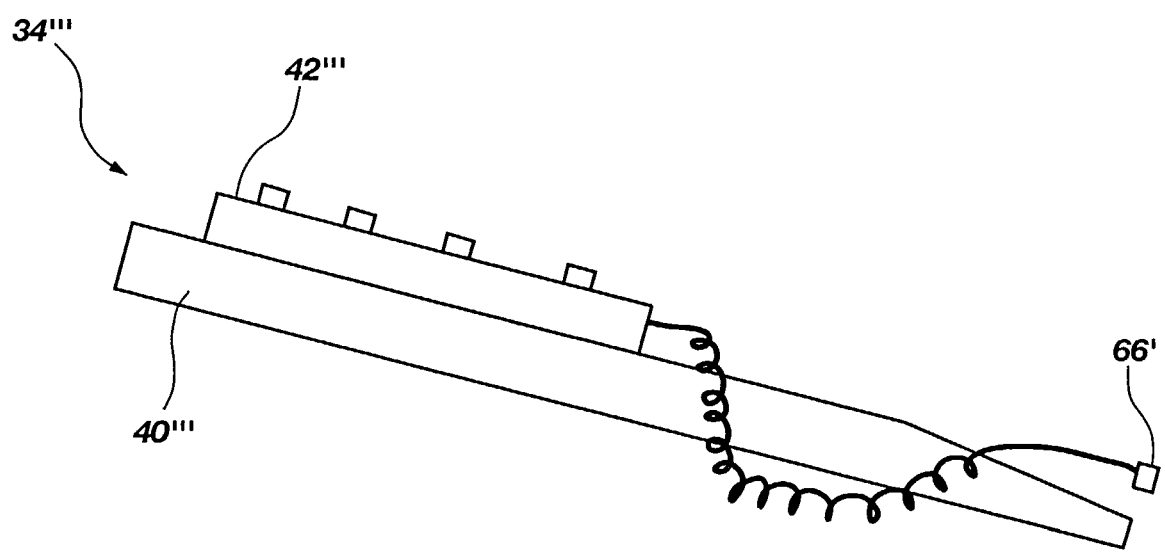
FIG. 8 illustrates a keyboard device, in accordance with yet another embodiment of the present invention.

Keyboard device 34 further includes a keyboard 42 which is in physical contact with a cantilevered portion of keyboard base 40. Keyboard 42 may assume various embodiments including a conventional external computer keyboard as well as a customized and even a reduced-sized keyboard. Additional specific embodiments and integrations are illustrated in FIGS. 6–8.

Figure 5:
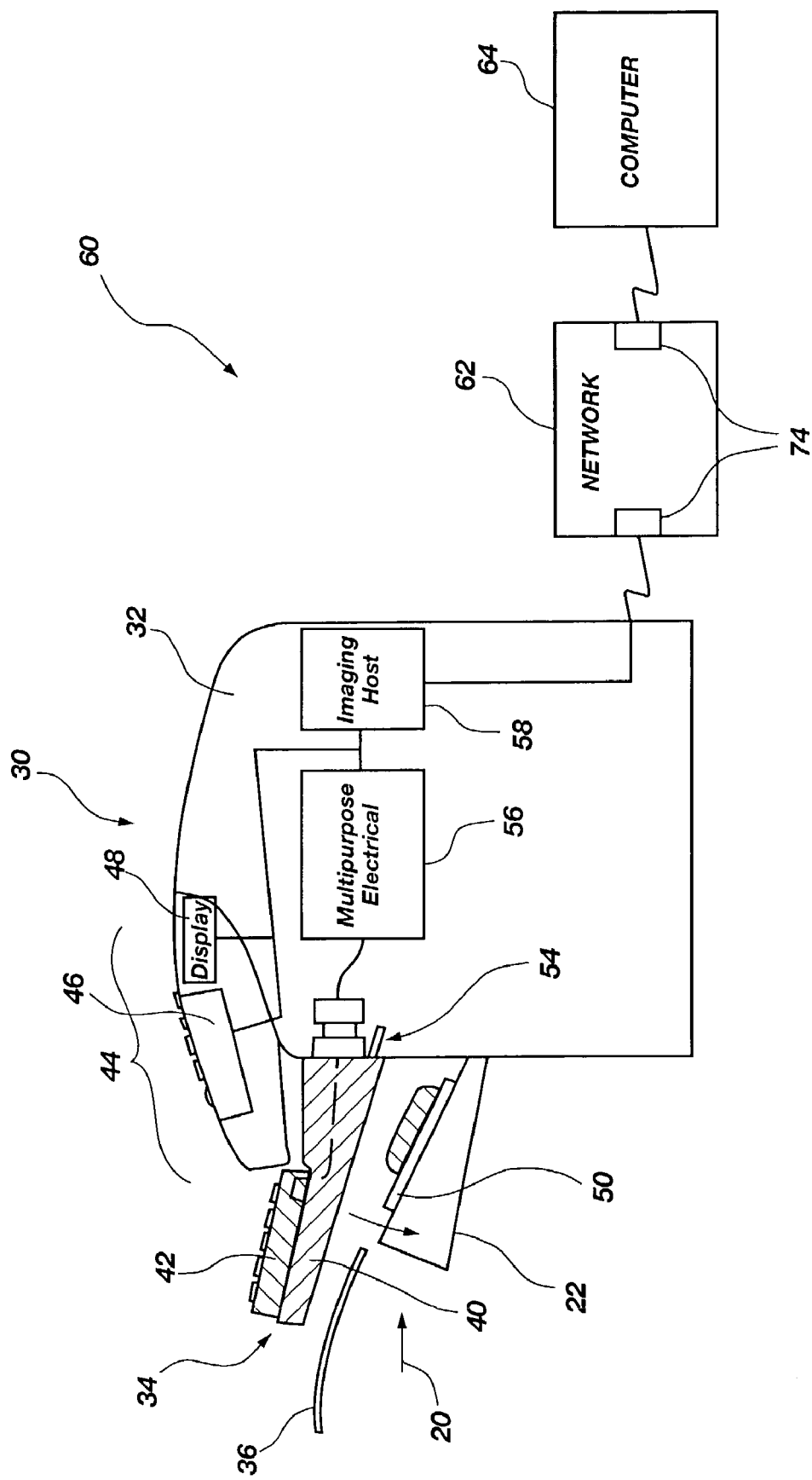
FIG. 5 is a cross-sectional view of an imaging device having the keyboard device interfaced thereto, in accordance with an embodiment of the present invention.

FIG. 5 illustrates a cross-sectional diagram of an imaging system 30 comprised of an imaging device 32 and a keyboard device 34, in accordance with an embodiment of the present invention. As described previously, imaging device 32 may be comprised from a myriad of various processing devices including printers, copiers, facsimile machines, scanners, photoprinters, and the like which are generally configured to process media in either a print application process or a print analysis process. Such devices are generally responsive to the input of data from a remote location or the analysis of data resident on the media. As such, imaging device 32 is generally comprised of a simplified user interface depicted in FIG. 5 as control panel 44. Generally speaking, control panel 44 is comprised of a control pad or keypad 46 and a display 48.

Imaging device 32 is further comprised of a multipurpose media tray 20 which, in the present embodiment, accommodates the keyboard device of the present invention through the opening of access panel 22 which reveals a multipurpose tray feeder 50 which enables the continued operation through the insertion or analysis of media 36 when configured with the keyboard device of the present invention. As described previously, when access panel 22 of the present embodiment is opened, mechanical and electrical couplers or profiles are revealed for facilitating the insertion or docking of a keyboard device 34. In one embodiment, this mechanical and electrical coupling is generically illustrated as keyboard device electromechanical coupler 54, which couples to and interfaces with a multipurpose electrical interface coupler 24 (FIG. 3) and mechanical coupling structures 26 (FIG. 3).

Keyboard device 34, as described, is comprised of keyboard 42 and keyboard base 40, both of which together facilitate data input into imaging device 32 by way of electromechanical coupler 54 and a multipurpose electrical interface 56 which, in the exemplary embodiment of the present invention, is facilitated and controlled by an imaging host 58. Imaging system 30 may be further coupled into an imaging network 60 comprised of a network 62 and other peripheral interfaces such as computer 64. Network 62 includes a plurality of access points 74 for coupling various peripherals such as imaging system 30 and computer 64. Imaging system 30 is further capable of generating email and otherwise routing processed media throughout network 62 by way of commands entered through keyboard device 34. Imaging system 30 may further include "digital sending," appreciated by those of skill in the art as providing the ability to generate and route email messages with attachments including attachments of images or other data processed by imaging device 32.

FIG. 6 is a cross-sectional view of a keyboard device, in accordance with one embodiment of the present invention. As illustrated, keyboard device 34' is comprised of a keyboard 42' which is physically adjacent to or otherwise attached to a keyboard base 40'. Keyboard base 40' is comprised of a generally planar support structure adequately resilient for supporting keyboard 42' in an operational attitude and preferably in an ergonomic arrangement enabling a user to input data into an imaging device when keyboard device 34' is coupled or docked thereto. Keyboard base 40' includes an interface illustrated generally as keyboard device electromechanical coupler 54'. Coupler 54', in the present embodiment, is comprised of an electrical interface 66 for facilitating electrical and operable communication with multipurpose electrical interface 56 (FIG. 5).

It is contemplated that multipurpose electrical interface 56 and the keyboard electrical signals 68 may be directly incompatible due to specific design guidelines. Keyboard 42' may take the form of a typical computer keyboard which is supported and otherwise attached to keyboard base 40'. In such an embodiment, keyboard electrical signals 68 may necessitate the use of signal conditioning 70. Therefore, one embodiment contemplates signal conditioning 70 for translating keyboard electrical signals 68 into signals compatible for interfacing with the imaging device, namely to provide compatibility with multipurpose electrical interface 56 (FIG. 5). Keyboard device electromechanical coupler 54' is further comprised of a mechanical interface 72 which provides corresponding and compatible mechanical coupling with the mechanical coupling structures 26 of FIG. 3.

FIG. 7 illustrates a keyboard device for coupling with an imaging device, in accordance with another embodiment of the present invention. In FIG. 7, a keyboard device 34" is comprised of a keyboard 42" and a keyboard base 40" which are integrally formed into a unitary assembly. In FIG. 7, the unitary nature of keyboard device 34" allows for the creation of compatible keyboard device signals to be presented to multipurpose electrical interface 56 (FIG. 5). However, as an alternative, the present embodiment further contemplates the possibility of direct incompatibility and the need for signal conditioning by way of signal conditioning 70' in order to facilitate compatible interaction.

FIG. 8 is a cross-sectional view of a keyboard device, in accordance with yet another embodiment of the present invention. As illustrated, keyboard device 34''' is comprised of a keyboard 42''' and a passive keyboard base 40''' which generally provides for mechanical support and coupling with the imaging device. In the present embodiment, it is contemplated that keyboard 42''' provides its own electrical interface 66' for electrical communication with multipurpose electrical interface coupler 24 (FIG. 3). Those of skill in the art appreciate that such an electrical coupling by keyboard 42''' allows keyboard base 40''' to include few if any electrical components. Electrical compatibility between keyboard 42''' and multipurpose electrical interface 56 (FIG. 5) may be accomplished by designing one of the interfaces, electrical interface 66' or multipurpose electrical interface 56 of imaging device 32, to comply with the signaling protocol of the other.

An attachably removable keyboard device for interfacing with an imaging device for use in entering data into an imaging device has been presented. The keyboard finds applications to data entry into devices where the input mechanism is unsophisticated or otherwise not conducive to comfortable data entry. The keyboard find application in relationship to printers, copiers, and facsimile and scanning devices. Although the present invention has been described with reference to specific embodiments, the invention is not limited to these embodiments. Rather, the invention is limited only by the appended claims, which include within their scope all equivalent devices or methods which operate according to the principles of the invention as described.

What is claimed is:

1. A keyboard device for interfacing with an imaging device having a display thereon, comprising:
   a keyboard base having a keyboard base interface for coupling to an external interface adjacent to said display of said imaging device, said imaging device including a multipurpose media tray having an accessory port for coupling with said keyboard base; and
   an attachably removable keyboard substantially operably supported by said keyboard base and operably coupled as a data input device to said imaging device.

2. The keyboard device, as recited in claim 1, wherein said keyboard base provides both mechanical and electrical coupling of said keyboard to said imaging device.

3. The keyboard device, as recited in claim 1, wherein said keyboard base, when attached to said imaging device, maintains said keyboard in a user-ergonomic attitude.

4. The keyboard device, as recited in claim 1, wherein said keyboard base interface of said keyboard base is a mechanical support interface and said keyboard electrically couples to said imaging device.

5. The keyboard device, as recited in claim 1, wherein said keyboard and said keyboard base are integrally coupled into a unitary device.

6. The keyboard device, as recited in claim 1, wherein said keyboard is a computer keyboard.

7. The keyboard device, as recited in claim 1, wherein said keyboard base further comprises signal conditioning for translating keyboard electrical signals into compatible imaging device signals.

8. An imaging system, comprising:
   an imaging device having a display thereon; and
   an attachably removable keyboard device for interfacing with said imaging device in a user-operable cantilever arrangement with said display, said keyboard device comprising:
      a keyboard base having a keyboard base interface for coupling to an external interface adjacent to said display of said imaging device, said imaging device including a multipurpose media tray having an accessory port therein, said keyboard base for coupling into said accessory port; and
      a keyboard substantially operably supported by said keyboard base and operably coupled as a data input device to said imaging device.

9. The imaging system, as recited in claim 8, wherein said keyboard base provides both mechanical and electrical coupling of said keyboard to said imaging device.

10. The imaging system, as recited in claim 8, wherein said keyboard base interface of said keyboard base is a mechanical support interface and said keyboard electrically couples to said imaging device.

11. The imaging system, as recited in claim 8, wherein said keyboard and said keyboard base are integrally coupled into a unitary device.

12. The imaging system, as recited in claim 8, wherein said keyboard is a computer keyboard.

13. The imaging system, as recited in claim 8, wherein said keyboard base further comprises signal conditioning for translating keyboard electrical signals into compatible imaging device signals.

14. An imaging network, comprising:
a network having a plurality of network access points, said network being capable of relaying a message between said plurality of network access points; and
an imaging system coupled to at least one of said network access points, said imaging system including:
an imaging device having a display thereon; and
an attachably removable keyboard device for interfacing with said imaging device, said imaging system for formulating said message for dispatch to another one of said plurality of network access points via said network, said keyboard device comprising:
a keyboard base having a keyboard base interface for coupling to an external interface adjacent to said display of said imaging device, said imaging device including a multipurpose media tray having an accessory port for coupling with said keyboard base; and
a keyboard substantially operably supported by said keyboard base and operably coupled as a data input device to said imaging device.

15. The imaging network, as recited in claim 14, wherein said message is an email message.

16. The imaging network, as recited in claim 15, wherein said email message includes an attachment of media processed by said imaging device and is addressed to said another one of said network access points by information input by said keyboard device.

17. The imaging network, as recited in claim 14, wherein said keyboard base provides both mechanical and electrical coupling of said keyboard to said imaging device.

18. The imaging network, as recited in claim 14, wherein said keyboard base interface of said keyboard base is a mechanical support interface and said keyboard electrically couples to said imaging device.

19. The imaging network, as recited in claim 14, wherein said keyboard and said keyboard base are integrally coupled into a unitary device.

20. The imaging network, as recited in claim 14, wherein said keyboard is a computer keyboard.

21. The imaging network, as recited in claim 14, wherein said keyboard base further comprises signal conditioning for translating keyboard electrical signals into compatible imaging device signals.

* * * * *